United States Patent [19]

Martin

[11] Patent Number: 5,049,218

[45] Date of Patent: Sep. 17, 1991

[54] MAGNETIC SUPPORT & TRANSPORT SYSTEM

[76] Inventor: Geoffrey Martin, 707 S. Clairborne, Olathe, Kans. 66062

[21] Appl. No.: 445,461

[22] Filed: Dec. 4, 1989

[51] Int. Cl.[5] .......................... E04F 13/00; B44C 7/00
[52] U.S. Cl. ..................................... 156/71; 156/361; 156/391; 156/523; 156/574; 156/577; 104/281; 104/283; 180/7.1; 180/901
[58] Field of Search ................. 104/93, 283, 286, 126, 104/281; 156/361, 391, 523, 574, 71, 379.6, 577; 105/77, 141, 148, 150; 362/398, 74; 15/49 R; 180/6.2, 7.1, 901

[56] References Cited

U.S. PATENT DOCUMENTS

| | | | |
|---|---|---|---|
| 2,104,062 | 1/1938 | Temple | 29/81.1 |
| 3,036,791 | 5/1962 | Siggelkow | 242/107 |
| 3,609,612 | 9/1971 | Tibbling | 335/289 |
| 3,709,194 | 1/1973 | Hammelmann | 118/305 |
| 3,777,834 | 12/1973 | Hiraoka et al. | 180/901 |
| 3,810,515 | 5/1974 | Ingro | 180/901 |
| 3,829,347 | 8/1974 | Honea | 156/523 |
| 3,871,940 | 3/1974 | Antonioni | 156/523 |
| 3,958,652 | 5/1976 | Urakami et al. | 180/7.1 |
| 4,328,061 | 5/1982 | Off et al. | 156/353 |
| 4,574,030 | 3/1986 | Pilcher | 156/522 |
| 4,740,257 | 4/1988 | Halls et al. | 156/92 |
| 4,750,968 | 6/1988 | Sweeny | 156/523 |
| 4,827,622 | 5/1989 | Makar | 33/770 |
| 4,882,999 | 11/1989 | Azukigawa | 104/281 |

FOREIGN PATENT DOCUMENTS 978600 12/1964 United Kingdom ................ 180/901

Primary Examiner—David A. Simmons
Assistant Examiner—J. Sells
Attorney, Agent, or Firm—Litman, McMahon & Brown

[57] ABSTRACT

A magnetic support and transport system comprising a plurality of permanent magnets for interacting with ferrous T-bars of a ceiling grid to counteract gravitational attraction. A plurality of rollers maintain an air gap between the magnets and the grid. A remotely controlled electric motor drives at least one of the rollers and thereby transports the system along the T-bars. Opposing pairs of guides maintain alignment of the system with the T-bars. Each pair of the guides is adapted to automatically retract upon encountering transversely oriented T-bars. When used for grid resurfacing and redecorating applications, the system can support a tape dispenser adapted to transfer adhesive pressure sensitive tape to downwardly exposed surfaces of the grid. A modified embodiment of the present invention is adapted to support surveillance equipment.

11 Claims, 3 Drawing Sheets

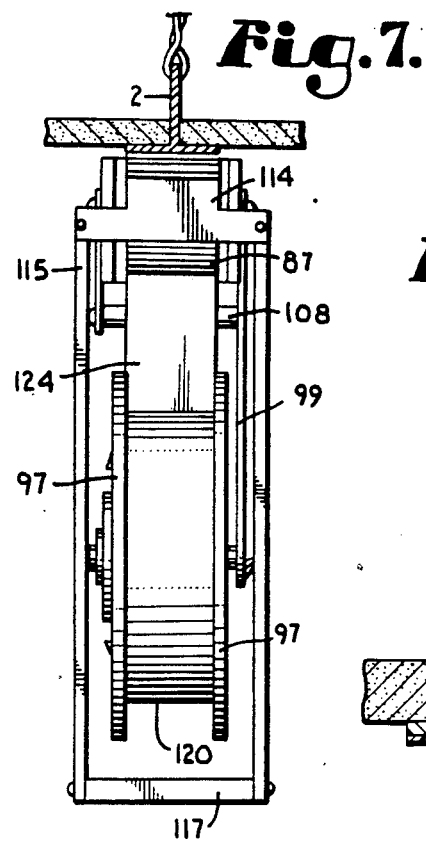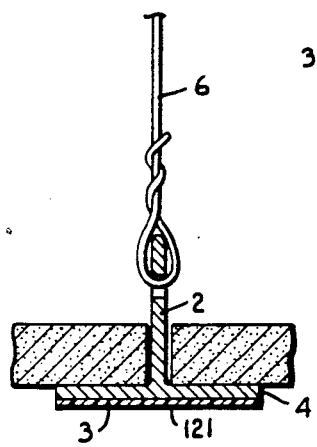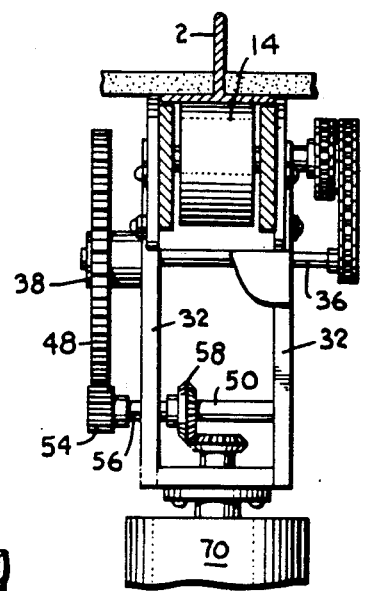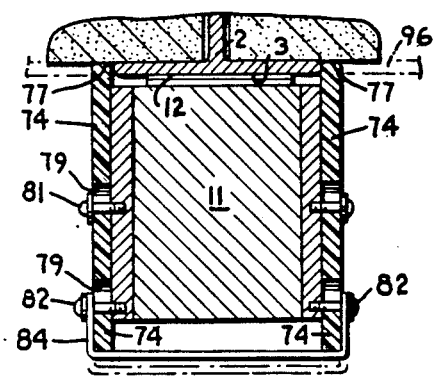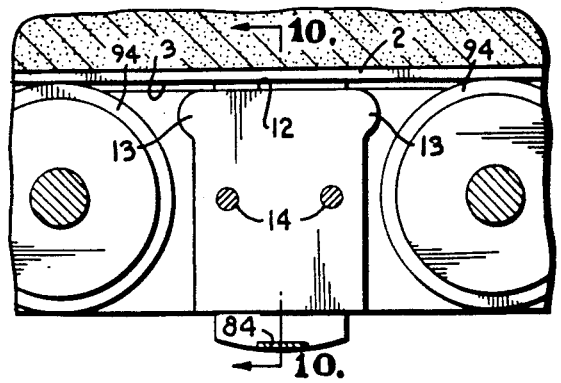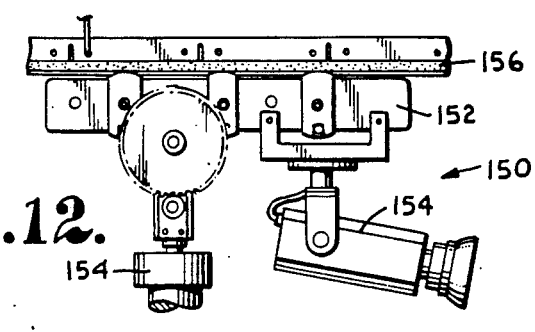

MAGNETIC SUPPORT & TRANSPORT SYSTEM

BACKGROUND OF THE INVENTION

1. Field of the Invention.

The present application relates to a magnetic support and transport system and method for magnetically suspending equipment and materials below a ferrous ceiling grid for cleaning or refurbishing the grid and/or ceiling tiles and for transporting equipment and materials.

2. Description of the Relevant Art.

In many buildings, certain maintenance projects and other activities either directly involve or occur in close proximity to the ceilings. For many of those activities, the erection of scaffolding or the use of stilts is necessitated due to the substantial spacing between the floor and the ceiling. Unless the space has been vacated, one must contend with furniture, fixtures and other obstructions when moving the scaffolding or stilts from place to place. Therefore, a need exists for an apparatus and a method which can utilize the space near the ceiling without the necessity of erecting scaffolding or using stilts. Such activities could thus conceivably be conducted while interfering only minimally with other activities therebelow.

Many commercial ceilings include metallic materials. For example, a typical suspended ceiling may consist of a matrix grid system comprising regularly intersecting metal strips, or "T-bars", suspended by hangers from the structure of the building. For commercial applications, the T-bars are often constructed of ferrous materials and have downwardly-exposed flanges or faces with horizontal widths of approximately one inch. The T-bars are typically installed with their lower faces generally coplanar and are typically arranged in a criss-cross or grid pattern with the T-bars intersecting at intervals of, for example, one, two, or four feet. The openings framed by the intersecting T-bars can receive ceiling tiles, light fixtures, vents, etc., with corresponding rectangular configurations.

One activity involving the space in close proximity to the ceiling directly involves the T-bars of the ceiling grid. The coatings on the exposed, planar faces of the T-bars, which are subjected to discoloration or an accumulation of surface adherents from exposure to chemicals, smoke particles, and the like, sooner or later require maintenance or replacement. One approach has been to entirely remove the old ceiling and replace it with a newly installed grid matrix and fresh ceiling tile. This is an expensive solution, not only by direct labor and material cost standards but also by lost use of the premises while the ceiling grid and tile are being replaced. In addition, coordination and participation of craftspersons from a variety of the construction trades would generally be involved in such an undertaking.

A second approach, which aleviates some of the expense, has been to replace only the ceiling tile while the grid is left intact and unaltered. Although such an approach can be less expensive, new ceiling tile juxtaposed to a marred or discolored grid can be unattractive.

Yet another approach has been to apply paint or other liquid coatings to the exposed surfaces of the ceiling grid. An inherent difficulty with this approach is the need to cover walls, floors and furnishings to avoid the adverse effects of overspray, drippings and splatters. Similar precautions are required when the tiles or grid are cleaned in place for protection from the cleaning chemicals.

Even new ceiling construction has a presently existing limitation—the finish on the T-bars is generally readily available in only two colors: white or black. Any other color or pattern desired for a new installation requires special-order handling with a corresponding increase in cost and delay in delivery. Therefore, a definite need exists whereby the cosmetic appearance of the ceiling grid can be renewed or altered without replacement, painting or cleaning.

Another application which enjoys only partial utilization of the substantial available space near the ceiling involves surveillance equipment. In commercial and industrial properties where remote observation is needed, cameras and other equipment are sometimes situated at selected locations to provide inconspicuous vantage points. Generally a sizeable number of such units must be installed in order to maximize visual access. A usual compromise is to place the units where substantial areas of the premises can be observed, leaving the remaining unsupervised areas to chance. Therefore, a definite need exists whereby equipment, such as surveillance equipment, can be maneuvered along a ceiling such that a greater area is placed under the auspices of a roving unit, thus reducing the capital expenditure which would otherwise be necessitated by the installation of additional units at fixed locations.

SUMMARY OF THE INVENTION

The embodiments of the present invention described herein comprise a support and transport system which can be magnetically linked to installed T-bars constructed of ferrous material. Since the suspension elements of the T-bar grid are usually more than adequate to support the substantial weight of the entire ceiling system, sufficient excess structural strength exists to comfortably withstand such additional loads suspended from the T-bar grid.

The magnetic support and transport system comprises a plurality of permanent magnets housed in a framework with a plurality of freely rotatable rollers along the top thereof. The rollers are in direct contact with the planar downwardly-exposed surface of the grid. The rollers maintain a small air gap between the T-bar and the magnets, and thus allow the unit to move along the T-bar without rubbing against the exposed planar surface of the T-bar.

Another roller with a peripheral surface which provides good traction and which is in direct contact with the exposed surface of the T-bar is powered by a reversible, variable speed motor. The direction and speed of the motor can be remotely controlled, either by electromagnetic signals, such as infra-red signals, or by a lengthy flexible cable, which operably provides control by an operator who is remotely situated from the magnetic support and transport system.

Along each side of the framework are guides which extend upwardly along each side of the exposed surface of the T-bar. These guides constrain the support and transport system to follow along a T-bar as directed by the operator with the controls.

As an additional safeguard, microswitches, installed at appropriate fore and aft extremities, may be utilized such that when the support and transport system encounters an obstacle, such as a wall, a microswitch is depressed thereby interrupting the current from the power source and thus halting the unit.

A first embodiment of the present invention comprises a taping mechanism for dispensing and applying adhesive pressure sensitive tape to the T-bars for refinishing or redecorating purposes. Suspended below the magnetic support and transport system is a tape dispenser with a roll of adhesive pressure sensitive tape, a take up reel for the protective strip as it is removed from the tape, and a setting or press roller for pressing the tape against the exposed face of the T-bar.

As power is supplied to the drive motor, the magnetic support and transport system moves along the T-bar, starting from near one vertical wall at one end of the T-bar and continuing to the other wall at the opposing end of the T-bar while dispensing and applying tape enroute.

The system and method may be utilized to refurbish existing T-bar grid installations, or to alter the color of new T-bar grid following the installation thereof to adapt the T-bar to preferred decorator schemes and thus avoid time delays and substantial cost enhancements arising from otherwise special order requirements.

A modified embodiment of the present invention utilizes the magnetic support and transport system to maneuver surveillance equipment along a T-bar such that much greater visibility is provided by a smaller number of installed units.

A pair of the magnetic support and transport systems may be operated in concert along parallel T-bars to provide more comprehensive applicability of the present invention.

OBJECTS OF THE INVENTION

Therefore, the objects of the present invention are: to provide a system and method for magnetically suspending a self-propelled mechanism from a metallic ceiling grid constructed of ferrous materials; to provide such a system which eliminates the need to remove and replace ceiling tile for maintenance purposes thereof; to provide such a system which reduces or eliminates the need to remove and replace the T-bars in a ceiling grid; to provide such a system which reduces or eliminates the need to clean or paint ceiling grid; to provide such a system which reduces or eliminates the need for installing scaffolding for activities performed relative to a ceiling grid; to provide such a system which greatly reduces or eliminates the need to move furniture and fixtures to facilitate certain tasks or projects performed in the vicinity of a ceiling grid; to provide such a system which eliminates the need to cover furniture, fixtures, walls and floors with throwcloths for protection from overspray from cleaning or refinishing; to provide such a system which facilitates the ability to utilize decorator colors on a newly installed ceiling grid without incurring prohibitive special order costs or significant time delays; to provide such a system which facilitates cleaning ceiling tile without removal thereof from its suspended grid system; to provide such a system which dispenses and transfers tape for refinishing and refurbishing an installed ceiling grid system; to provide such a system which provides the ability to remotely install electrical wiring along the T-bars of a grid system; to provide such a system which provides the ability to transport equipment and material along the T-bars of a ceiling grid system; and to generally provide such a system which is relatively easy to use, simple to maintain, easy to operate efficiently and reliably, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged and fragmentary cross-sectional view of a T-bar with associated ceiling tile.

FIG. 7 is an enlarged, end elevational view of the present invention.

FIG. 8 is an enlarged cross-sectional view taken generally along line 8—8 of FIG. 3.

FIG. 9 is a fragmentary, enlarged cross-sectional view similar to that shown in FIG. 6, showing normal spacing between a magnet of the present invention and a ceiling T-bar.

FIG. 10 is an enlarged cross-sectional view taken generally along line 10—10 of FIG. 9, wherein a pair of guides are shown in an extended position in solid lines and in a retracted position in phantom lines.

FIG. 12 is a modified embodiment of the present invention showing a surveillance application.

DETAILED DESCRIPTION OF THE PREFERRED EMBODIMENTS

Figure 1:
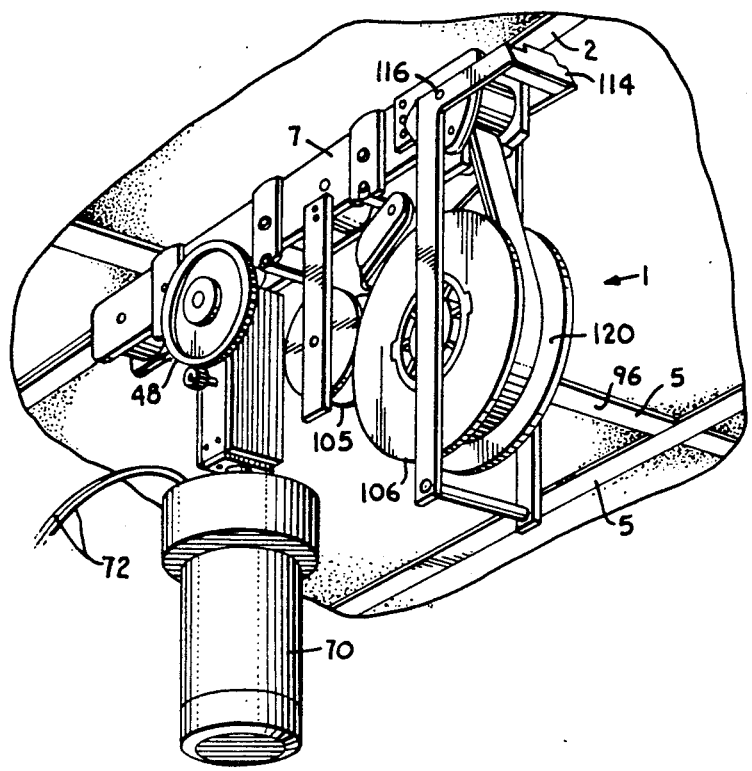
FIG. 1 is a perspective view of a magnetic support system for a taping transfer system in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned, derivatives thereof and words of similar import.

The reference numeral 1 generally refers to a magnetic support and transport system in accordance with the present invention. The apparatus 1 is operably suspended from a T-bar 2 as shown in perspective in FIG. 1. The T-bar 2 has a horizontal exposed flange or face 3 and a vertical thickness 4. A plurality of the T-bars 2 forms a grid 5, which is suspended from a superstructure (not shown) by hanger wire 6 through openings 6a in legs or webs 6b of the T-bars 2. Most ceiling grid systems have sufficient load carrying capacity, over and above the weight of the ceiling system itself, such that substantial additional ability exists to support other equipment and materials therefrom, such as with the present apparatus 1, without jeopardizing the structural integrity thereof. The apparatus 1 is designed to travel along the T-bar 2 as hereinafter described.

Figure 4:
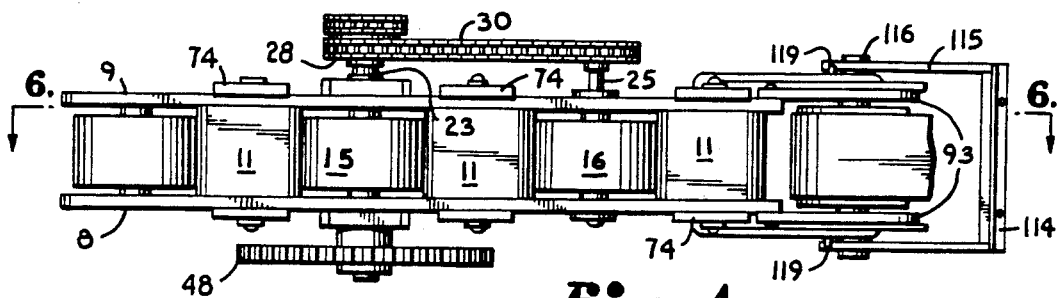
FIG. 4 is a top plan view of the present invention.

A chassis or vehicle body 7 of the magnetic support and transport system 1 of the present invention has two sides 8 and 9 as shown in FIG. 4. The sides 8 and 9 are constructed of aluminum or other suitable lightweight material. Each of the sides 8 and 9 has a substantially straight upper extremity 10.

Interposed between the sides 8 and 9 is a plurality of strong permanent magnets 11. Each of the magnets 11 has a planar upper surface 12 and a pair of bumpers 13. The bumpers 13 are arcuate such that the curvatures thereof grade smoothly and tangentially into the corresponding planar upper surfaces 12. The bumpers 13 are constructed either integrally with the magnets 11 or are constructed of high impact plastic or other suitable material and are adhesively secured to the magnets 11.

The magnets 11 are rigidly secured between the sides 8 and 9, for example, with bolts (not shown) or other suitable fasteners inserted through bores 14, whereby the upper surfaces 12 form a composite plane which is substantially parallel to a plane formed by the upper extremities 10 of the sides 8 and 9. The body 7, consisting of the two sides 8 and 9 rigidly secured to the magnets 11, has a width which is dimensioned slightly greater than the standard width of readily available T-bars 2.

Also interposed between the sides 8 and 9 is a pair of drive rollers 15 and 16. The rollers 15 and 16 are constructed of nylon, teflon, or other suitable material. The rollers 15 and 16 have substantially identical diameters and each has an upper extremity 17. The drive rollers 15 and 16 are rigidly secured to axles 19 and 20, respectively. The axles 19 and 20 are inserted through bores 21 in the sides 8 and 9 whereby the rollers 15 and 16, in combination with their respective axles 19 and 20, can rotate freely therein. The upper extremities 17 of the drive rollers 15 and 16 form a plane which is substantially parallel to the aforesaid plane formed by the upper extremities of the sides 8 and 9.

The axle 19 has an end 23 and the axle 20 has an end 25 which extend outwardly from the side 9. Rigidly secured to the end 25 of the axle 20 is a sprocket 27. Rigidly secured to the end 23 of the axle 19 is another sprocket 28. The sprocket 28 is substantially identical to the sprocket 27 and is aligned substantially co-planar therewith. In one application of the present invention, the sprockets 27 and 28 each have 12 teeth. A drive chain 30 is entrained over the sprockets 27 and 28. Spacing between the axles 19 and 20 is adapted to substantially eliminate all slack from the chain 30.

Extending downwardly from the sides 8 and 9 is a pair of arms 32. The arms 32 are substantially aligned vertically from the axle 19 and are rigidly secured to the sides 8 and 9. A motor support plate 33 is rigidly secured between the distal ends of the arms 32.

An axle 34, with ends 36 and 38 extending outwardly from the arms 32, is rotatably and pivotally secured to the arms 32 in throughbores 40. A sprocket 42 is rigidly secured to the end 36 of the axle 34. Substantially in coplanar alignment with the sprocket 42 is a sprocket 44 which is rigidly secured near an outer extremity of the end 23 of the axle 19. A drive chain 46 is entrained around the sprockets 42 and 44. The spacing between the axles 19 and 34 is adapted to substantially eliminate all slack in the chain 46. In one application of the present invention, the sprockets 42 and 44 each have 9 and 12 teeth, respectively.

Near the end 38 of the axle 34, a large gear wheel 48 is rigidly secured. Another axle 50 is rotatably and pivotally secured in the arms 32 in a coaxial pair of throughbores 52. A small gear wheel 54 is rigidly secured to an end 56 of the axle 50. The gear wheels 48 and 54 are constructed of nylon or other suitable material. The spacing between the axles 38 and 50 is dimensioned such that the teeth of the large gear wheel 48 are positively meshed with the teeth of the small gear wheel 54. In one application, gear wheels 48 and 54 have 96 and 12 teeth, respectively, providing an 8-to-1 gear reduction ratio.

Between the two arms 32, a bevel gear 58 is rigidly secured to the axle 50. The spacing of the gear 58 is adapted such that the gear 58 meshes with another bevel gear 60 which is rigidly secured to an axle 62 which is rotatably and pivotally secured in a throughbore 64 in a bushing 66 (made of porous bronze or other suitable material) which, in turn, is secured in a throughbore 68 of the motor support plate 33. In one application of the present invention, the bevel gears 58 and 60 have 20 and 10 teeth respectively, providing a 2-to-1 gear reduction ratio.

Rigidly secured to the distal end (not shown) of the axle 62 where it extends downwardly from the motor support plate 33 is a reversible, variable speed, direct current electromotor 70 (such as a Model No. FN30-T33N1B as manufactured and/or distributed by Canon of Lake Success, N.Y.) A long, flexible cable 72 connected to a controller (not shown) provides a person, either on the floor or otherwise remotely removed from the magnetic support and transport system 1, with the ability to control the direction and speed that the motor 70 propels the system 1 along the T-bar 2 as hereinafter described. Alternatively, the motor 70 may be adapted such that it may be remotely controlled with wireless, electromagnetic signals such as infra-red signals. Also alternatively, the system 1 may derive its power from self-contained batteries (not shown).

On outside vertical surfaces of the sides 8 and 9 and immediately opposite each of the magnets 11 is a pair of guides 74. The guides 74 are constructed of teflon, nylon or other suitable material. Each of the guides 74 has an arcuate upper surface 76 with an upper extremity 77. Each of the guides 74 has a pair of vertically oriented oblong slots 79. The guides 74 are slideably secured to the sides 8 and 9 with screws or bolts 81 and 82 through the slots 79. The thickness of the guides 74 is minimized such that the guides 74 can easily travel in the width tolerance normally available along the reveal edge (not shown) of recessed ceiling tile without binding between such reveal edge and the grid flange 3.

Figure 5:
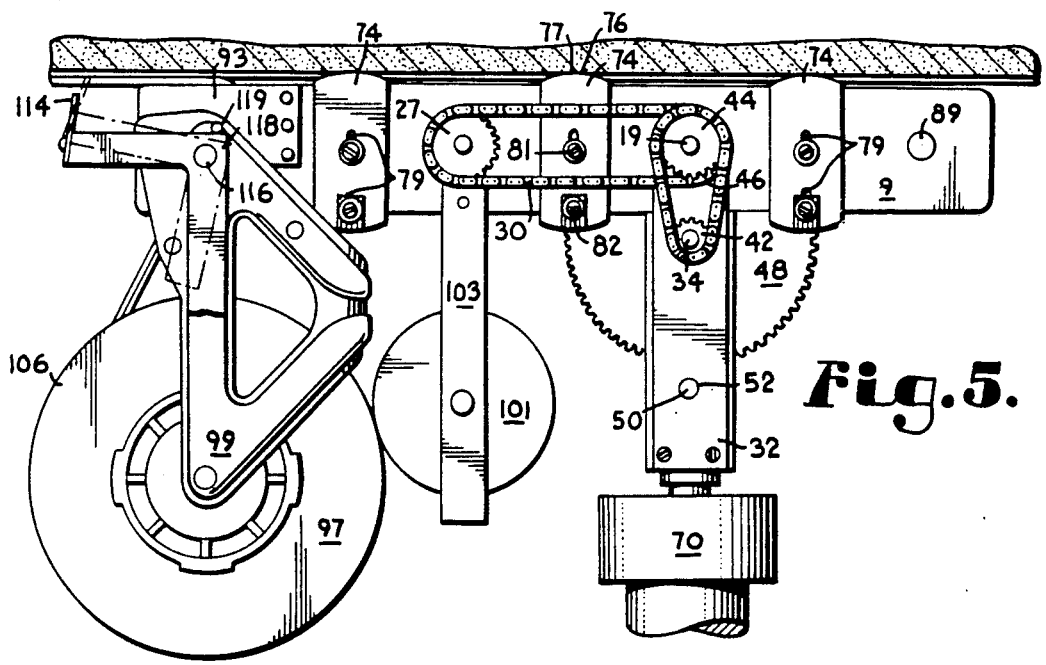
FIG. 5 is an enlarged, fragmentary, side elevational view wherein a cutter is shown in a normal position in solid lines and in a cutting position in phantom lines.
Figure 6:
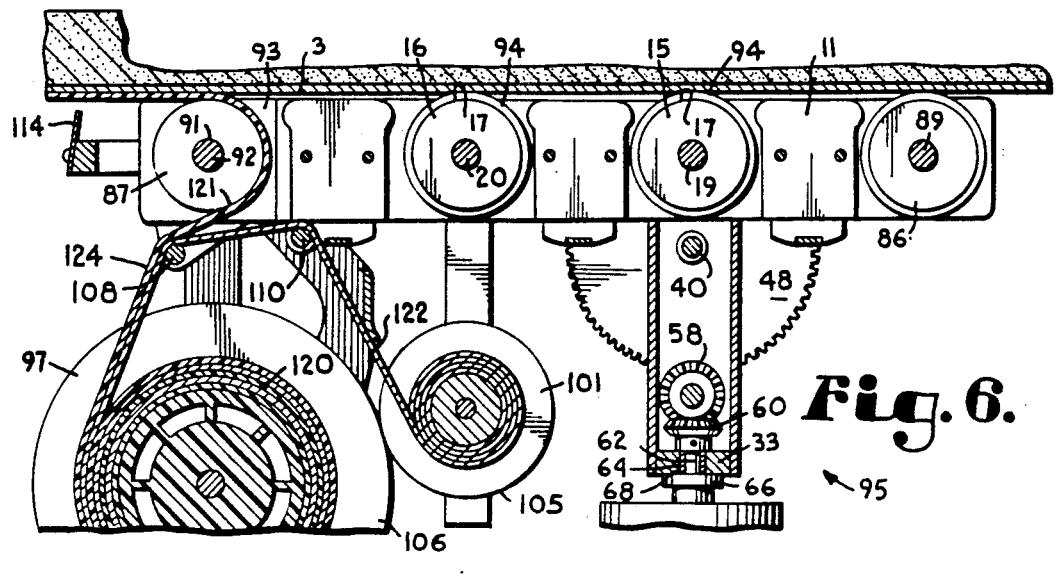
FIG. 6 is an enlarged, fragmentary, cross-sectional view taken generally along line 6—6 of FIG. 4.

The guides 74 are adapted to seek their uppermost position, as shown in FIGS. 5 and 10, such as by biasing each of the pair of guides 74 with a stretched elastic strip 84 passing beneath the guides 74, with the ends of the strip 84 secured with the bolts 82. When the guides 74 are biased to their uppermost configuration, the extremity 77 of each guide 74 projects upwardly from the extremity 17 a distance at least equal to the combined thicknesses of the width 4 of the T-bar 2 and the width of a spacer wrapped about the circumferential surfaces of the rollers 15 and 16 as hereinafter described.

In addition to the drive rollers 15 and 16, the magnetic support and transport system 1 may have additional rollers, such as the idler rollers 86 and 87. The diameter of the idler rollers 86 and 87 are dimensioned substantially identically to the diameter of the drive rollers 15 and 16. The roller 86 has a throughbore 89 and is rotatably and pivotally secured about an axle 90 which, in turn, is rigidly secured to the sides 8 and 9.

For taping applications as hereinafter described, the width of the roller 86 is dimensioned substantially similar to the width of the drive rollers 15 and 16, whereas the roller 87 is approximately one-inch wide to correspond with the width of the face 3 of the T-bar 2. To accommodate the greater width of the roller 87, the roller 87 has a throughbore 91 and is rotatably and pivotally secured about an axle 92 which, in turn, is rigidly secured to extensions 93 which are rigidly secured to the sides 8 and 9.

In an actual application of the magnetic support and transfer system 1, such as transferring tape to the face 3 of a T-bar 2 as hereinafter described, one or more layers of a spacer 94, such as pressure sensitive tape or other suitable material, is removably secured to the circumferential surface of each of drive rollers 15 and 16 and the idler rollers 86 and 87. The spacers 94 provide the desired clearance or air gap between the upper surfaces 12 of the magnets 11 and the face 3 of the T-bar 2.

Figure 11:
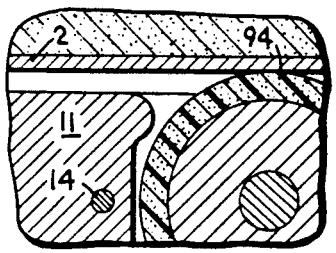
FIG. 11 is an enlarged and fragmentary cross-sectional view similar to that shown in FIG. 9, but showing a greater spacing between the magnet of the present invention and a ceiling T-bar.

The thickness of the spacers 94 must be greater than a certain minimum in order to facilitate movement of the magnetic support and transport system 1 along the grid without marring, scratching, or otherwise damaging the face 3 of the T-bar 2. Additional layers of the material used for the spacers 94 may be similarly applied to alter the spacing between the magnets 11 and the T-bar 2, as shown in FIG. 11. However, the total thickness of each of the spacers 94 must not be overly excessive in order to avoid unnecessary loss of the attractive forces between the magnets 11 and the ferrous T-bar 2. In one application of the present invention, "printer's friend", having a thickness of approximately 0.025 inches was used for the spacers 94.

The system 1 is then positioned immediately below the T-bar 2 such that the spacers 94 are placed against the T-bar 2 such that the entire magnetic support and transport system 1 and adaptations thereto are magnetically suspended therebeneath. The system 1 is positioned such that the upper extremities 77 of the guides 74 straddle the T-bar 2 as shown in FIGS. 7 and 10.

The aforementioned controller is then manipulated to provide electrical energy to the motor 70. By means of a drive assembly 95, comprising the bevel gears 58 and 60, the gear wheels 48 and 54, the sprockets 27, 28, 42 and 44, and the chains 30 and 46, the drive rollers 15 and 16 with spacers 94 thereabout, provide motive power for propelling the system 1, either forward or aft, along the T-bar 2. By further manipulation of the aforesaid controller, the system 1 may be propelled faster or slower, stopped, or reversed.

As the system 1 moves along the T-bar 2, the guides 74 regularly encounter a T-bar 96 which is oriented perpendicularly to the T-bar 2. The arcuate upper surfaces 76 of the guides 74 are adapted such that the cross T-bar 96 produces a downward biasing force on the guides 74 such that the guides 74 sufficiently retract to permit passage of the cross T-bar 96, as shown in phantom in FIG. 10. While the retracted guides 74 navigate across the cross T-bar 96, the other guides 74, which are not retracted, provide the necessary guidance to maintain alignment of the system 1 with the T-bar 2.

Further motion of the system 1 along the T-bar 2 carries the guides 74 beyond the obstructing cross T-bar 96 where the elastic strip 84 returns the guides 74 to their uppermost configuration, again as shown in FIG. 10. As the system 1 continues its motion along the T-bar 2, each of the other pairs of guides 74 is similarly depressed to permit passage of the system 1 across the obstructing cross T-bar 96 while the pairs of guides 74 not so depressed maintain alignment of the apparatus 1 with the T-bar 2.

In the event that the system 1 should encounter an obstruction sufficiently projecting below the face 3, the bumpers 13 are designed to assist in navigating any such obstructions.

The magnetic support and transport system 1 is includable as an integral portion of an apparatus designed to do specific tasks, such as applying adhesive pressure sensitive tape to the exposed face 3 of the T-bars 2 in a ceiling grid system 5 for refinishing or redecorating purposes. For that application, a tape dispensing reel 97 is rotatably and pivotally secured to a cradle 99 which is rigidly secured to the sides 8 and 9 such that the dispensing reel 97 is suspended therebeneath. In addition, a take-up reel 101 is rotatably and pivotally secured to a pair of support bars 103 which are similarly rigidly secured to the sides 8 and 9 such that the take-up reel 101 is also suspended therebeneath.

A circumferential edge 105 of the take-up reel 101 is spaced in slideable frictional contact with a circumferential edge 106 of the dispensing reel 97 such that the dispensing reel 97 drives the take-up reel 101 in a clutching relationship. (If necessary to enhance the frictional relationship between the edges 105 and 106 of the take-up reel 101 and the dispensing reel 97, one end of a tensioned string (not shown) may be secured to the tape cradle 99 with the other end thereof secured to the support bars 103 such that the bias and resulting frictional force between the edges 105 and 106 is thereby increased.) Guide rods 108 and 110 provide a path from the dispensing reel 97 to the takeup reel 101.

Figure 3:
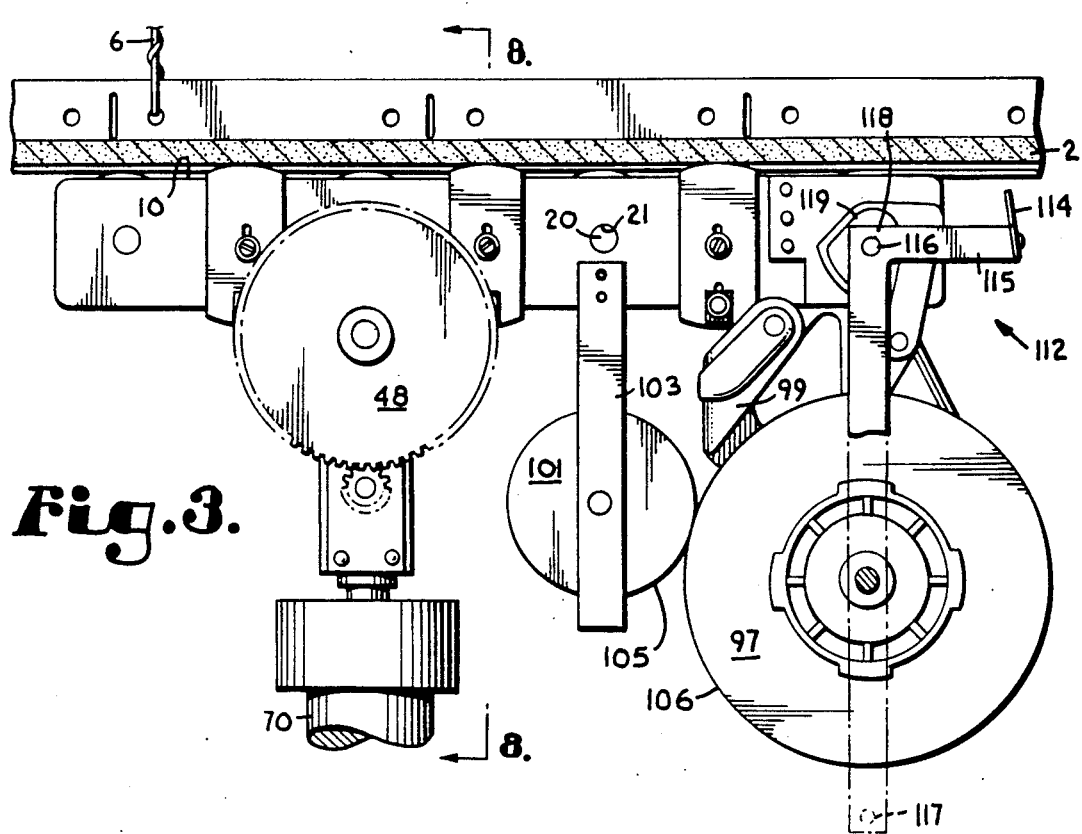
FIG. 3 is an enlarged, fragmentary, side elevational view of the present invention with portions cut away to show details thereof.

A cutter assembly 112 comprises a knife 114 attached to the ends of a pair of L-shaped arms 115 which, in turn, are rotatably and pivotally secured to an axle 116 rigidly secured to the sides 8 and 9. The arms 115 are rigidly secured to a handle 117 at the lower ends thereof. The cutter assembly 112 in its normal position is balanced such that an elbow 118 is gravitationally pressed against a peg 119. The knife 114 has a sharp cutting edge such that a rightward pull on the handle 117, as shown in FIG. 3, causes the knife 114 to arc upwardly, severing a tape as hereinafter described.

In an actual taping application of the present invention 1, a roll of covering material 120 is placed on the dispensing reel 97. The covering material 120 may be any satisfactory product which is readily available and which has a width substantially similar to the width of the T-bar face 3. Preferably, the covering material 120 is an adhesive pressure sensitive tape 121 with a protective backing 122 in a roll of approximately 300-500 feet in length.

A leading end 124 of the tape 121 with the backing 122 is then peeled off the roll 120 and is entrained over the guide rod 108. The protective backing 122 is then peeled loose from the leading end 124 and, after further entrainment over the guide rod 110, is affixed to the take-up reel 101. The tape 121 is wrapped around the roller 87 with the adhesive side thereof directed away from the roller 87. The system 1 is then placed against and near one end of the T-bar 2 which is to be resurfaced with the tape 121 such that the tape 121 is pressed against the T-bar 2 by the roller 87.

An operator on the floor activates the motor 70 causing the system 1 to be driven along the T-bar 2. As the system 1 moves therealong, the roller 87 accordingly rotates, thus causing more of the tape 121 with the backing 122 to be pulled from the reel 97. As the tape 121 and the backing 122 are pulled from the reel 97, the revolving edge 106 of the dispensing reel 97 rubs against the edge 105 of the take-up reel 101 causing the take-up reel to correspondingly rotate such that a bias is placed on the backing 122. Then, as the tape 121 and the backing 122 pass over the rod 108, the backing 122 separates from the tape 124 and proceeds over the rod 110 to the take-up reel 101.

As each pair of the guides 74 encounter the cross T-bar 96, they are automatically depressed downwardly, allowing the system 1 to continue traveling uninterruptedly along the T-bar 2.

When the system 1 reaches the end of a run along the T-bar 2, the power to the motor 70 is terminated by the operator and the cutter assembly 112 is tripped, such as by manually pulling on a cord (not shown) attached to the handle 117 such that the knife 114 arcs upwardly, striking and severing the tape 121, as shown in phantom in FIG. 5. Upon releasing the aforesaid cord, the counterbalancing provided by the arms 115 causes the knife 114 to pull away from the tape 121 until the elbow 118 presses against the peg 119.

To allow for possible operator inadvertence, microswitches (not shown) positioned at appropriate fore and aft extremitites of the system 1 can be adapted to terminate power to the motor 70 upon contact with an obstruction, such as a wall, which depresses such microswitch.

The system 1 is now ready to be manually reinstalled on one of the T-bars 2 which is adjacent to the T-bar 2 which has just been covered such that the aforesaid procedure can be repeated.

After covering the T-bars running parallel to each other, the system 1 is easily similarly set up to cover the cross T-bars 96. The tape 121 is sufficiently thin such that the joint at the juncture where the transverse runs overlap is relatively unnoticeable. The short exposed ends of the T-bar 2 where the tape 121 applied by the system 1 does not quite reach the vertical walls bounding the T-bar grid 5 can be easily manually covered with short pieces of tape 121.

A modified embodiment of the magnetic support and transport system 150 is shown in FIG. 12. Much of the previous description provided herein similarly applies to this modified embodiment 150 and will not be reiterated here in detail. A body 152 comprising permanent magnets (not shown) provides supporting forces for the modified system 150. Suspended from the body 152 is a surveillance camera 154. When visibility is required in an unobserved portion of a commercial establishment, a motor 154 is remotely activated to propel the system 150 along a ceiling T-bar 156 to provide the desired visual access. With a relatively quiet motor 154, the movement of the system 150 will pass unnoticed to the unwary and unsuspecting. The use of the modified embodiment 150 will greatly reduce the number of such surveillance instruments normally required.

Alternatively, the present invention may be used to quickly and easily perform other installation requirements, such as placing telephone or computer cables overhead along a ceiling grid. In addition, two such magnetic support and transport systems may be operated in concert from two parallel T-bars to greatly expand the applicable uses of the present invention.

It is to be understood that while certain forms of the present invention have been illustrated and described herein, it is not to be limited to the specific forms or arrangement of parts described and shown.

What is claimed and desired to be secured by Letters Patent is as follows:

1. In a system for supporting and transporting equipment and materials along an existing ceiling grid having a flange constructed of ferrous materials, the improvement comprising:
   (a) magnetic suspension means for countering gravitational forces;
   (b) motive means for propelling said equipment and materials along said existing grid; and
   (c) an opposing pair of upwardly biased guides; each of said guides having an arcuate upper surface with an upper extremity normally extending alongside said flange for guiding said system along said existing grid.

2. The supporting and transporting system according to claim 1 wherein:
   (a) said suspension means comprises a plurality of strong permanent magnets magnetically interacting with said existing grid.

3. The supporting and transporting system according to claim 2 wherein:
   (a) said motive means is a roller pressed against said existing grid wherein said roller is powered by a remotely controlled electric motor.

4. A support and transport system for following a T-bar of an existing ceiling grid constructed of ferrous materials, said T-bar having a flange, comprising:
   (a) a plurality of permanent magnets adapted to suspend said system from said T-bar;
   (b) a plurality of pairs of guides adapted to maintain alignment of said system with said T-bar; each of said guides having an arcuate upper surface with an upper extremity normally extending alongside said flange for guiding said system along said existing grid,
   (c) a plurality of rollers adapted to maintain a gap between said magnets and said T-bar;
   (d) a drive roller powered by an electric motor which is adapted to propel said system along said T-bar; and
   (e) a control mechanism adapted for remote operation of said motor.

5. The support and transport system according to claim 4 including:

(a) a dispenser adapted to dispense adhesive pressure sensitive tape; and (b) transfer means for applying said tape to an exposed surface of said T-bar.

6. The support and transport system according to claim 4 including:

a dispenser adapted to dispense adhesive pressure sensitive, electrically insulated conductors; and (b) transfer means for applying said conductors to an exposed surface of said T-bar.

7. The support and transport system according to claim 4 wherein:

(a) two of said systems are adapted to operate in concert along two parallel T-bars.

8. A support and transport system wherein:

(a) a plurality of permanent magnets interact with an installed ferrous ceiling grid to counter gravitational attraction;

(b) a plurality of rollers wherein said rollers maintain spacing between said magnet and said grid and wherein one or more of said rollers provide traction means for propelling said system along said grid;

(c) a plurality of guides for maintaining alignment of said system with said grid;

(d) a remotely controlled electric motor adapted to drive said traction rollers such that said system is propelled along said grid;

(e) a first reel for dispensing adhesive pressure sensitive tape;

(f) a second reel adapted for collecting a protective strip which has been removed from said tape; and (g) a cutter mechanism for severing said tape.

9. A method for refinishing or redecorating the T-bars of an installed ferrous ceiling grid, comprising the steps of:

(a) suspending a tape transfer system below said grid with magnetic forces between a plurality of permanent magnets and said T-bar;

(b) propelling said system along said T-bar; and (c) dispensing pressure sensitive tape such that the tape adheres and covers a lower exposed face of said T-bar.

10. A support and transport system for following a T-bar of an existing ceiling grid constructed of ferrous materials comprising:

(a) a plurality of permanent magnets adapted to suspend said system from said T-bar;

(b) a plurality of guides adapted to maintain alignment of said system with said T-bar;

(c) a plurality of rollers adapted to maintain a gap between said magnets and said T-bar;

(d) a drive roller, powered by an electric motor which is adapted to propel said system along said T-bar;

(e) a control mechanism adapted for remote operation of said motor;

(f) a dispenser adapted to dispense adhesive pressure sensitive tape; and (g) transfer means for applying said tape to an exposed surface of said T-bar.

11. A support and transport system for following a T-bar of an existing ceiling grid constructed of ferrous materials comprising:

(a) a plurality of permanent magnets adapted to suspend said system from said T-bar;

(b) a plurality of guides adapted to maintain alignment of said system with said T-bar;

(c) a plurality of rollers adapted to maintain a gap between said magnets and said T-bar;

(d) a drive roller, powered by an electric motor which is adapted to propel said system along said T-bar;

(e) a control mechanism adapted for remote operation of said motor;

(f) a dispenser adapted to dispense adhesive pressure sensitive, electrically insulated conductors; and (g) transfer means for applying said conductors to an exposed surface of said T-bar.

* * * * *